3,226,243
PLASTERING COMPOSITION

Martin Levin, Philadelphia, Pa., assignor, by mesne assignments, to Joseph A. Ritter, Narberth, Pa.
No Drawing. Filed Oct. 19, 1962, Ser. No. 231,849
9 Claims. (Cl. 106—109)

This application is a continuation-in-part of my co-pending application Serial No. 200,332, filed on June 6, 1962, and now abandoned.

This invention is directed to a plastering composition, and more particularly, to a plastering composition which may be applied directly to concrete ceilings.

Prior plastering compositions used in conjunction with concrete ceilings, and the like, have suffered from a number of serious difficulties. One of the largest problems in plastering over concrete results from the fact that the concrete is very rough since the same is generally pitted with holes and contain protruding ridges, especially where two slabs meet. In order to keep these surface irregularities to a minimum, a high grade, high cost plywood is used for the forms. This smoothness is required when conventional plastering materials are applied because they cannot be applied beyond a certain thickness without cracking and chipping.

With the present invention, all concern about the roughness of the concrete is eliminated since the subject plastering composition can be put on as thickly as necessary to cover all the imperfections in the concrete and despite this greater thickness, it will not crack or chip. Further, the plastering composition of the present invention will harden to the same degree of hardness as the concrete itself. This results not only in a uniform and smooth finish which does not show the seams between the concrete slabs but also in a substantially indestructible ceiling or wall as the case may be. Accordingly, the concrete contractor can use a much cheaper grade of rough finish plywood for his forms thereby substantially lowering the cost of the concrete work.

With other types of plastering materials, it is necessary to grind or chip the concrete in order to form a surface with which a bond can be made. This involves high labor costs. No such grinding or chipping is necessary to achieve a perfect bond with the plastering composition of the present invention. The plastering composition of the present invention has a butter-like consistency thereby enabling it to be spread by trowel with far greater physical ease. This results in the plasterer covering a greater area in a shorter time period. When more water is added the composition can be sprayed on to achieve a uniform smooth textured finish. Hence, lesser skilled workers can do a plastering job and provide a smooth uniform finish on the wall or ceiling.

The plastering composition of the present invention is white and with the passage of time remains as white as when it was applied. It will retain its whiteness far longer than any white painted conventional plaster ceiling. If a colored ceiling is desired, a coloring agent can be mixed with the plastering composition and the resulted color ceiling will give the same satisfactory service as a white ceiling, without the necessity of painting the same. Prior compositions have presented difficulties in obtaining a uniform paint finish. Hence, prior compositions tended to differentially react with paint or other protective coatings. The plastering composition of the present invention reacts uniformly to paint or other protective coatings so as to convey a uniform appearance.

In applying a conventional plastering composition to a wall, the same is generally applied in three stages. First a bonding agent is applied to the concrete. Then a base coat is applied to the bonding agent and a finish coat is applied thereover. Heretofore, no plastering composition could be applied with a thickness greater than one-eighth of an inch, and most plastering compositions could only be applied to a thickness of one-sixteenth of an inch. The plastering composition of the present invention can be applied up and more than one-quarter of an inch in thickness thereby eliminating all concern about the roughness of the concrete.

It is an object of the present invention to provide an improved plastering composition.

It is another object of the present invention to provide a plastering composition which may be uniformly applied to a concrete surface without regard to cracks, ridges or pits in the concrete surface.

It is another object of the present invention to provide a plastering composition which may be uniformly painted and/or coated with a protective pigment.

It is another object of the present invention to provide a plastering composition having a relatively high water repellency.

It is still another object of the present invention to provide a plastering composition which may be sprayed onto a surface.

It is still another object of the present invention to provide a plastering composition which will remain sufficiently butter-like in consistency when in batch form and yet will harden to the hardness of concrete when applied to a wall or ceiling.

It is still another object of the present invention to provide a plastering composition which is white in color and sufficiently hard and smooth so as to eliminate the necessity of applying an outer pigmented coating if the same is desired.

Other objects will appear hereinafter.

These and other objects are accomplished by the plastering composition of the present invention which comprises a uniform mixture of about 80 to 125 pounds of fine industrial sand, and preferably about 100 pounds of fine industrial sand; about 40 to 60 pounds of hydrated lime, and preferably about 50 pounds of hydrated finish lime, about 5 to 14 pounds of Keene's cement, and preferably about 8 pounds of Keene's cement; about 3 to 8 pounds of finely divided perlite, and preferably about 5 pounds of finely divided perlite; and about 1 to 4 ounces of finely divided Florida zircon, and preferably about 2 ounces of Florida zircon.

The above composition should preferably be dry blended and then mixed with approximately 6 to 10 gallons of water and preferably of the order of 8 gallons of water, although the amount of water which may be added may be controlled so as to give the desired consistency.

The sand to be used in the composition of the present invention should be a high grade industrial sand. A preferred sand which I have utilized is obtained from Williamstown, New Jersey, and is termed Pettinas No. 57 sand. This sand has a chemical analysis in weight percent of approximately 98.5 to 99.5% silica; 0.15 to 0.35% $Fe_2O_3$; about 0.05 to 0.15% $Al_2O_3$; about 0.05 to 0.15% of MgO; and a trace of CaO. The loss on ignition of the sand is 0.10% maximum. I have used a finely divided grade which passes through American Fine Screens 55 and 60. Prior to my invention, I am aware of no one who has ever used fine industrial sand as an ingredient in a plastering composition which is applied as a smooth finished surface on a wall, ceiling or the like. Heretofore, it has been proposed to utilize finely divided pumice or marble dust in a plastering composition. A plastering composition having pumice or marble dust does not have the advantages of the composition of the present invention. Further, pumice and marble dust cost approximately twenty times the cost of fine industrial sand.

The hydrated finish lime which I have utilized is Red Top Hydrated Finish Lime which complies with the specifications of ASTMC 6 Type N, and Federal Specification SS–L–351, Type F. This material is described in Bulletin A.I.A. File 21–A of the United States Gypsum Company. However, other hydrated limes may be utilized. For example, the Super Limoid of the Warner Company, Philadelphia 3, Pa., may be utilized. Limoid is also commercially available from other manufacturers.

The Keene's white cement which I have utilized is Red Top Keene's cement. This is a dead-burned finely ground gypsum product which complies with both ASTMC 61 and Federal Specification SS–C–161. It will be noted that the amount of Keene's cement is substantially less than the recommended amounts of Keene's cement which have been proposed heretofore for plastering compositions and the like. The amount of Keene's cement which I utilize in the plastering composition of the present invention prevents the composition from hardening in batch and yet is sufficient in amount to enable the applied composition to harden. This reduction in the amount of Keene's cement results in a substantial saving since Keene's cement is relatively expensive.

Perlite which I have utilized is a lightweight aggregate whose specifications and composition have been regulated by the Perlite Institute, Inc., 45 W. 45th Street, New York 36, N.Y. The specifications for this material are described in the bulletin of the Perlite Institute, Inc., A.I.A. File Nos. 3–D–3 and 37–B–2. The perlite which I have utilized conforms to the sieve analysis and density requirements of ASTMC 332.

The Florida zircon which I have used is designated "G" zircon. It is essentially 96% or more of $ZrSiO_4$. It has a specific gravity of 4.5, a bulk density of 95 pounds per cubic foot, and it disassociates at about 3200° F. I prefer to use a find grind in which about 1% is retained at 325 mesh.

I have found that the presence of Florida zircon in my plastering composition renders the same superior to compositions proposed heretofore. While Florida zircon is a preferable ingredient, it is not an essential ingredient. The manner in which Florida zircon combines with the other ingredients is not known. It is believed that the Florida zircon in some way contributes to the water repellancy of my plastering composition since it is insoluble in water, dilute mineral acids, alkalis and hot concentrated $H_2SO_4$.

The perlite is a preferred ingredient, but is not an absolutely essential component depending upon the intended manner of applying the plastering composition. The perlite makes the plastering composition relatively light in weight, fire resistant, and enables the composition to be sprayed thereby enabling the attainment of a uniform texture and finish. When these attributes are not necessary or desirable, the perlite may be eliminated as an ingredient.

Heretofore, Limoid was not used in a plastering composition because it is harder to spread and must generally be left overnight to slack. However, the presence of industrial sand in the composition of the present invention cuts the Limoid and enables the same to be spread more easily.

In order to illustrate the subject invention, I am presenting by way of example, and not by way of limitation, the following. It is to be understood that any chemist skilled in the art of plastering compositions could modify the following in light of the present disclosure in much the same manner that a skilled mechanical engineer could modify a machine. It is to be assumed that no one will seek to modify the following so as to produce an inoperative composition.

*Example I*

100 pounds of Williamstown, New Jersey, fine industrial sand, 50 pounds of hydrated lime, 10 pounds of Keene's cement, 5 pounds of perlite, and 2 ounces of Florida zircon were dry blended to achieve intimate mixing. Then 8 gallons of water were slowly added to the mixture to produce a putty-like mass of butter-like consistency. This mass was utilized as a plastering composition by troweling the same on a concrete surface. When the composition dried, it attained the hardness of concrete, had a uniform texture and finish, was water repellant, and had a white uniform color. When coated with a pigment, the dry plastering composition was of uniform appearance. The composition could be applied in thicknesses up to and more than one-quarter of an inch. All pits, cracks, ridges and the like in the concrete were completely invisible.

The composition of Example I, when additional water was added, had a consistency which enabled the same to be sprayed. The batch of Example I retained its consistency for a sufficiently long period of time so that it was not necessary to complete the entire ceiling in one day. This is a marked advance over compositions proposed heretofore which required a plasterer to finish a wall or ceiling immediately before leaving the site of the wall at the end of a work day.

*Example II*

The composition of Example I was repeated, however the Florida zircon was eliminated as an ingredient. The resulting composition performed in substantially the same manner as described above but lacked to some extent the advantage of water repellency.

*Example III*

The composition of Example I was repeated, however the perlite was eliminated as an ingredient. The resulting composition performed in the same manner as described above except that it was difficult to spray the composition so as to attain a uniform texture and finish and sound absorptive properties were slightly reduced.

*Example IV*

100 pounds of Williamstown, New Jersey, fine industrial sand, 50 pounds of hydrated finishing lime, and 8 pounds of Keene's cement were dry blended to achieve intimate mixing. Then 8 gallons of water were slowly added to the mixture to produce a putty-like mass of butter-like consistency. This mass was used as a plastering composition on a concrete surface having pits, ridges, cracks, etc. The mass dried to a hardness of concrete. The mass was of uniform color. The mass was difficult to spray and was not water repellent. In order to obtain a uniform texture and finish, the plasterer required sufficient time to trowel the mass so as to obtain a uniform texture and finish.

While the plastering composition in each of the above-identified examples was white, and remained white when applied, a coloring agent can be mixed with the composition in the above examples to give any colored composition as desired. In this manner, the ceiling or wall need not be painted. The cost of the materials utilized in the above examples is far less than the cost of conventional plastering materials. The ability of the composition to be sprayed on eliminates the necessity for skilled plasterers, enables the composition to be applied much faster, and reduces the cost of a plastered wall or ceiling. Accordingly, the plastering composition of the present invention offers a substantial reduction in the cost of obtaining a plastered wall or ceiling having advantages not capable of being attained by conventional plastering compositions proposed heretofore.

The present invention may be embodied in other specific forms without departing from the spirit or essential attributes thereof and, accordingly, reference should be made to the appended claims, rather than to the foregoing specification as indicating the scope of the invention.

I claim:

1. A plastering composition to be mixed with water consisting essentially of about 80 to 125 parts by weight of industrial sand; 40 to 60 parts by weight of hydrated finishing lime; 8 to 14 parts by weight of Keene's white cement; and $1/16$ to $1/4$ part by weight of Florida zircon.

2. A plastering composition in accordance with claim 1 which includes about 3 to 8 parts by weight of perlite.

3. A plastering composition in accordance with claim 1 in which about 48 to 480 parts by weight of water is added to the composition.

4. A plastering composition in accordance with claim 1 consisting essentially of 100 parts by weight of fine sand; 50 parts by weight of finishing lime; 10 parts by weight of Keene's white cement; and $1/8$ part by weight of Florida zircon.

5. A plastering composition in accordance with claim 2 consisting essentially of 100 parts by weight of fine industrial sand; 50 parts by weight of finishing lime; 10 parts by weight of Keene's white cement; 5 parts by weight of perlite; and $1/8$ part by weight of Florida zircon.

6. A plastering composition to be mixed with water, which plastering composition may be applied to concrete and yield a smooth finish with a perfect bond to the concrete, and which plastering composition reacts uniformly to paint so as to convey a uniform appearance, said plastering composition consisting essentially of 80 to 125 parts by weight of fine industrial sand; 40 to 60 parts by weight of hydrated lime; and 5 to 14 parts by weight of Keene's white cement.

7. A plastering composition in accordance with claim 6 in which about 48 to 480 parts by weight of water is added to the composition.

8. A plastering composition to be mixed with water, which plastering composition may be applied to concrete and yield a smooth finish with a perfect bond to the concrete, and which plastering composition reacts uniformly to paint so as to convey a uniform appearance, said plastering composition consisting essentially of 80 to 125 parts by weight of fine industrial sand; 40 to 60 parts by weight of hydrated lime; 5 to 14 parts by weight of Keene's white cement; and 3 to 8 parts by weight of perlite.

9. A plastering composition in accordance with claim 8 in which about 48 to 480 parts by weight of water is added to the composition.

References Cited by the Examiner

UNITED STATES PATENTS

| Re. 18,739 | 2/1933 | Roos | 106—111 |
| 2,000,371 | 5/1935 | Bauer | 106—109 |
| 2,803,556 | 8/1957 | Carlsson et al. | 106—109 |
| 2,868,660 | 1/1959 | Lemmon | 106—109 |
| 2,890,129 | 6/1959 | Kaufmann | 106—109 |
| 3,035,940 | 5/1962 | Hobson | 117—105.5 |
| 3,093,505 | 6/1963 | Conway | 106—110 |

FOREIGN PATENTS 520,491  1/1956  Canada.

OTHER REFERENCES

Condensed Chem. Dictionary (4th ed., 1950), published by Reinhold, New York (page 509).

TOBIAS E. LEVOW, *Primary Examiner.*